Sept. 13, 1938.  A. S. FITZ GERALD  2,129,920
ELECTRIC CONTROL SYSTEM
Filed May 15, 1936  2 Sheets-Sheet 1

INVENTOR
Alan S. FitzGerald

Sept. 13, 1938.  A. S. FITZ GERALD  2,129,920
ELECTRIC CONTROL SYSTEM
Filed May 15, 1936   2 Sheets-Sheet 2

INVENTOR
Alan S. FitzGerald

Patented Sept. 13, 1938

2,129,920

UNITED STATES PATENT OFFICE 2,129,920

ELECTRIC CONTROL SYSTEM

Alan S. Fitz Gerald, Wynnewood, Pa.

Application May 15, 1936, Serial No. 79,884

5 Claims. (Cl. 177—353)

This invention relates to electric remote control systems and more particularly to arrangements embodying saturating reactors such as, for example, apparatus of the general type I have described in U. S. Patents No. 2,021,099 and No. 2,027,312.

It is an object of my invention to provide a novel selective control action in respect of a number of individual electric devices or circuits. It is a further object to provide control characteristics, for each individual circuit selectively controlled, analogous to those of a "latched-in" type of circuit breaker, or so-called "stick relay".

Figure 1:
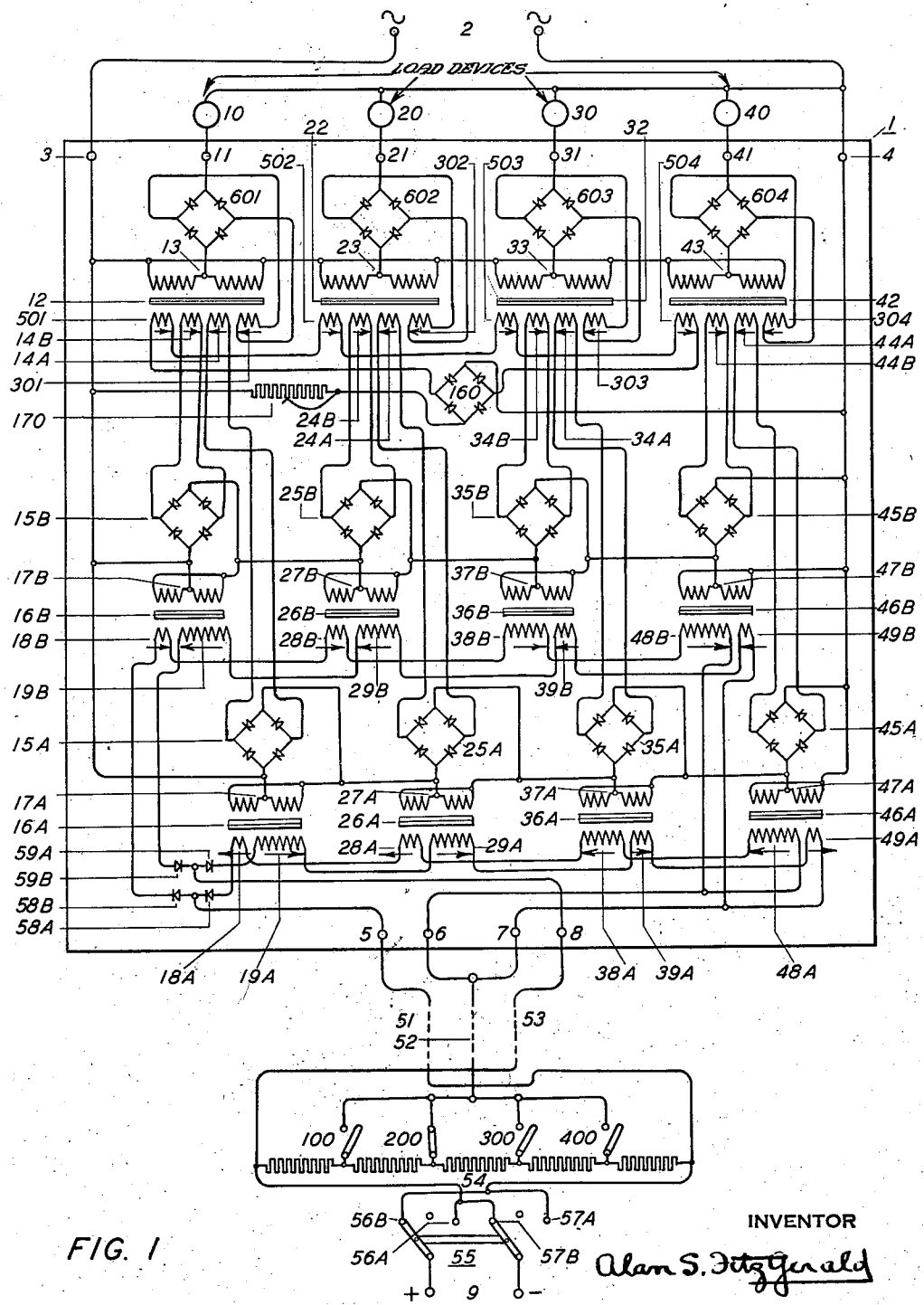
Figures 2, 3:
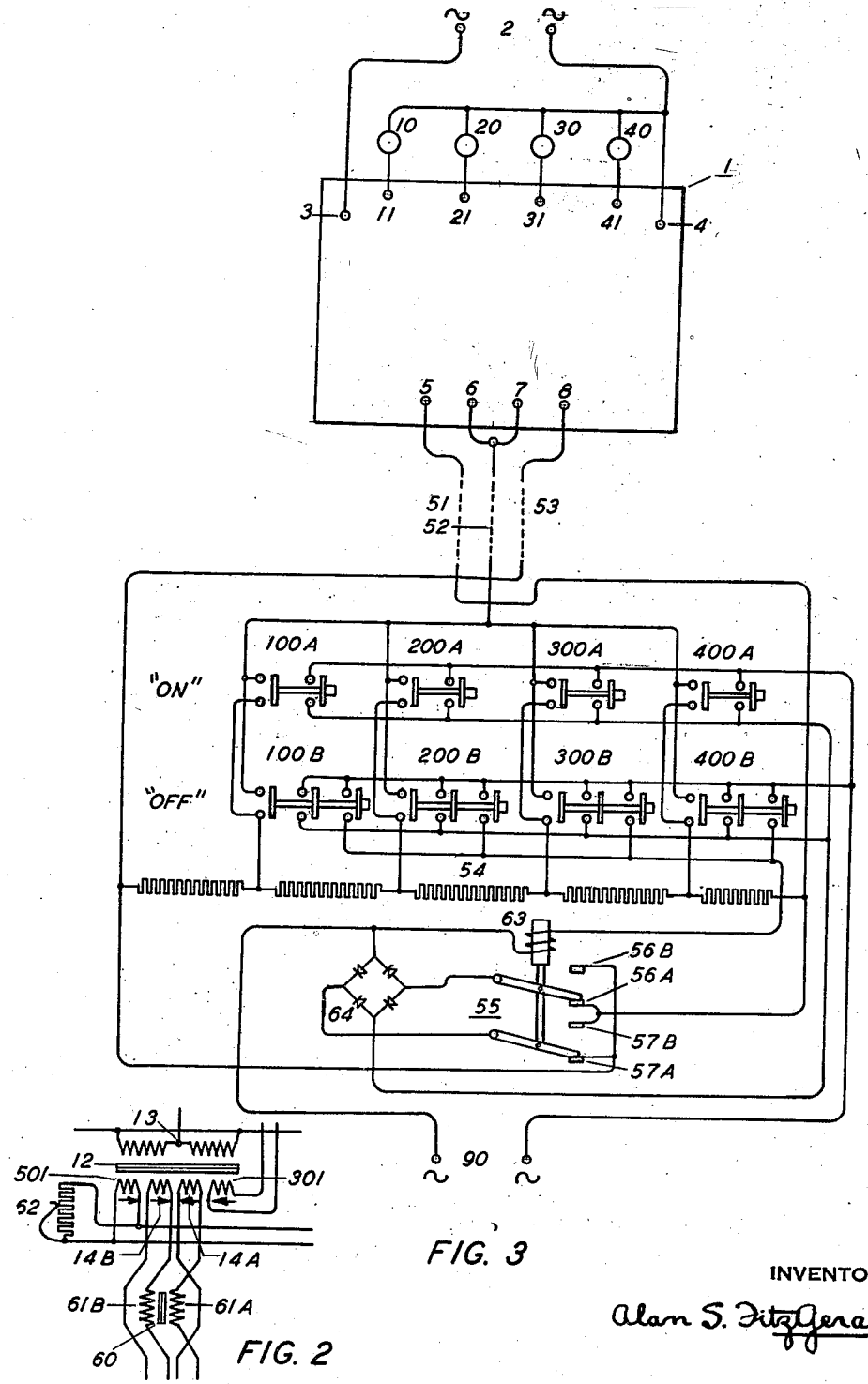

These and other novel features, which I believe to be characteristic of my invention, will be set forth with particularity in the appended claims. My invention itself, however, both as to its organization and method of operation, together with further objects and advantages thereof, may best be understood with reference to the following description taken in connection with the accompanying drawings, in which Fig. 1 is an electric circuit diagram representing an embodiment of my invention;

Fig. 2 is a diagram showing details pertaining to the embodiment shown in Fig. 1; and Fig. 3 is an electric circuit diagram representing a modification of the embodiment of my invention shown in Fig. 1.

In Fig. 1, I show a selective control system 1, arranged in accordance with my invention, energized from an alternating current source 2 and adapted to control energy consuming devices 10, 20, 30 and 40.

While I have shown only four controlled load circuits, in order to describe and explain the operation of my invention in a simple manner, and to avoid complexity in the drawings, I wish it clearly to be understood that my invention is capable of controlling much greater numbers than four. The maximum number of load circuits, which may be controlled, depends upon the magnitude of the control currents employed, which latter are limited by heating of the coils. Thus a larger number of load circuits may be controlled if the system is to be operated intermittently than is possible if the system is continuously energized. At least twenty such load circuits can readily be controlled in the manner described, and the maximum number possible is substantially greater than twenty.

My selective receiving system 1 has terminals 3 and 4 for connection to the source 2, and, in addition, terminals 11, 21, 31 and 41, to which one terminal of each of the load circuits 10, 20, 30, 40 is connected, the remaining terminals being commonly connected to one terminal of the source 2. Further terminals 5, 6, and 7, 8 are energized by incoming signal or control currents whereby the load circuits 10, 20, 30, 40, may, one at a time, be energized, or de-energized, in accordance with "on" and "off" characteristics embodied in the control currents.

To facilitate the explanation of my invention I have identified all members and circuit elements associated with the "on" function by a suffix "A", and all parts associated with the "off" function by a suffix "B".

The system 1 includes a plurality of saturating reactors 12, 22, 32, 42, having reactance windings 13, 23, 33, 43 and saturating windings 14A, 14B, 24A, 24B, 34A, 34B 44A, 44B. The reactance windings of these reactors are connected in series with the load circuits 10, 20, 30, 40, as shown in the drawings. The saturating windings 14A, 14B, 24A, 24B, 34A, 34B, 44A, 44B are energized respectively with direct current from rectifiers 15A, 15B, 25A, 25B, 35A, 35B, and 45A, 45B.

The system 1 also includes further saturating reactors 16A, 16B, 26A, 26B, 36A, 36B, 46A, 46B, having reactance windings 17A, 17B, 27A, 27B, 37A, 37B, 47A, 47B, and having each two saturating windings 18A, 19A, 18B, 19B, etc. The four reactance windings 17A, 27A, 37A, 47A, are connected in series to terminals 3 and 4. The reactance windings 17B, 27B, 37B, 47B are likewise connected in series to 3 and 4. These reactance windings are thus energized in two groups with alternating current from the source 2. In parallel with each of the reactance windings 17A, 17B, etc. of the reactors 16A, 16B, etc., I connect the alternating or input sides of the rectifiers 15A, 15B, etc. Each of these rectifiers is thus energized with alternating current in accordance with the alternating voltage drop across the reactance winding of one of the aforesaid saturating reactors.

The saturating windings of the reactors 16A, 16B, 26A, 26B, 36A, 36B, 46A, 46B, are divided into four groups each forming a complete series circuit. Thus 18A, 28A, 38A, 48A, are connected in series to terminals 5 and 6. Windings 18B, 28B, 38B, 48B, form a second group also connected in series to terminals 5 and 6. Saturating windings 19A, 29A, 39A, 49A, and 19B, 29B, 39B, and 49B form the third and fourth groups and are connected to terminals 7 and 8.

The saturating windings 18A, 28A, 38A, 48A, and 19A, 29A, 39A and 49A, respectively, are connected in opposition. Thus, referring, for example, to the saturating reactor 16A, the net saturating effect will be the difference between the direct current excitation set up in the winding 18A and that set up in the winding 19A. The same relation holds good for the reactors 26A, 36A and 46A.

The saturating windings 18B, 28B, 38B, 48B, and 19B, 29B, 39B, 49B are likewise connected in opposition.

The ratio between the numbers of turns of the two opposing saturating windings on each of the saturating reactors 16A, 26A, 36A and 46A, is dissimilar for each of these four reactors; 16B, 26B, 36B, 46B, likewise have different saturating turn ratios.

The circuits comprising the saturating windings 18A, 18B, 28A, 28B, 38A, 38B and 48A, 48B, are energized by applying direct current excitation to terminals 5 and 6. Likewise, the circuits which include 19A, 29A, 39A, 49A, and 19B, 29B, 39B, 49B, are energized by applying direct current excitation to terminals 7 and 8. The system 1 is selectively controlled by varying the relative magnitudes of the direct current excitation applied respectively to terminals 5, 6, and 7, 8 in the manner fully described in Patent No. 2,021,099.

Briefly, when one of the groups of four saturating reactors, 16A, 26A, 36A, 46A, for example, is controlled by the two ratio currents, due to the special turn ratios employed, in the manner above described, all of the reactors, except one, become saturated. Thus, the effective impedance of the reactance windings of the saturated reactors is low, but the impedance of the one winding situated on the reactor which receives, due to reciprocal coincidence between the turn ratio and the current ratio, zero saturating ampere turns, is much greater.

It therefore follows that the potential gradient along the series circuit, including the windings 17A, 27A, 37A, 47A, under this condition is non-uniform. A substantial portion of the voltage of the source 2 appears across the unsaturated reactor. A negligible voltage drop exists across the remaining reactors.

The rectifiers 15A, 25A, 35A, 45A, being connected in parallel with each of the windings 17A, 27A, 37A, and 47A, will be energized in accordance with the above voltage drops. Thus, when the current ratios are set so that one of the reactors 16A, 26A, 36A, 46A is unsaturated, the corresponding rectifier 15A, 25A, 35A, or 45A, will be energized in accordance with the increased voltage drop across the reactance winding.

I show in Fig. 1, the essential elements of an arrangement for transmitting controlling signals to the selective control system 1, the terminals 5, 6 and 7, 8 being energized through conductors 51, 52, 53. It will be noted that conductors 51 and 52 energize the saturating circuit which is connected to terminals 5 and 6. Likewise the circuit connected to terminals 7 and 8 is energized through 52 and 53, 52 being common to both circuits.

At the transmitting station I provide an arrangement, energized from a direct current source 9, for supplying to the three conductors 51, 52 and 53 relatively variable direct current voltages. Thus 52 is arranged, by means of switches 100, 200, 300, 400, to be connected to any one of a number of taps provided upon a resistor 54 connected across the source 9.

In Fig. 1, a portion of the conductors 51, 52, 53 is shown in broken lines to signify that the transmitting station may be at a distance from the receiving selective control system 1.

Where four load circuits are to be controlled, the resistor 54 is provided with five sections of equal resistance so as to provide four uniformly spaced taps, as shown, to which the switches 100, 200, 300, 400 are connected, all as described in Patent No. 2,021,099.

In addition, I show a reversing switch 55 having contacts 56A, 56B, 57A, 57B, by means of which the polarity of the direct current energization applied to the transmitting circuit may be reversed.

On referring to Fig. 1, it will be seen that the 2 groups of saturating reactors 16A, 26A, 36A, 46A, and 16B, 26B, 36B, 46B comprise a duplicate arrangement of the group of reactors 16, 26, 36 and 46 in Fig. 1 of the U. S. Patent No. 2,021,099, all of the connections being substantially identical. The two groups have their direct current circuits connected in parallel to terminals 5, 6 and 7, 8 and their alternating current circuits connected in parallel to terminals 3 and 4.

I show, in addition, in Fig. 1, four half wave rectifiers 58A, 58B, and 59A, 59B, connecting the two duplicate direct current saturating circuits 18A, 19A, etc. and 18B, 19B, etc. respectively, to the terminals 5, 6 and 7, 8. As shown in the diagram of connections, it will be seen that the effect of these rectifiers is to cause one or the other of the two parallel direct current saturating circuits to be energized selectively, according to the polarity applied to terminals 5, 6 and 7, 8, in accordance with the position of the switch 55. Thus, when switch 55 is closed on contacts 56A, 57A saturating windings 18A, 28A, 38A, 48A, 19A, 29A, 39A, 49A, are energized. Under this condition no current flows in 18B, 28B, 38B, 48B, 19B, 29B, 39B, 49B, since 58B and 59B do not conduct. Alternatively when switch 55 is closed on contacts 56B, 57B saturating windings designated by the suffix "B" are energized and no current flows in tne saturating windings indicated by the suffix "A".

The effect of this arrangement, therefore, is to provide a duplicate arrangement of reactors 16, 26, 36, 46 according to Fig. 1 of Patent 2,021,099 either one of said groups being selectable according to the position of switch 55. The controlling action of the switches 100, 200, 300, 400 in respect to the group so selected is provided precisely in the manner disclosed in the cited patent.

The reactors 12, 22, 32, 42 which control the current supplied to the loads 10, 20, 30, 40 are provided with additional saturating windings 301, 302, 303, 304 and 501, 502, 503, 504, and rectifiers 601, 602, 603, 604 for furnishing "stick relay" action, in the manner described in U. S. Patent 2,027,312. The windings 301, 302, 303, 304, correspond in function to the winding 3, in Fig. 1 of Patent 2,027,312, the windings 501, 502, 503, 504 correspond to the winding 5 and the rectifiers 601, 602, 603, 604 correspond to the rectifier 6.

All of the windings 501, 502, 503, 504, are connected in series to a rectifier 160, which, as shown, is energized in series with an adjustable resistor 170 from terminals 3 and 4. The windings 501, 502, 503, 504 are thus energized with rectified current the value of which is controllable by means of 170. The windings 301, 302, 303, 304, are severally connected to be energized with rectified current from the rectifiers 601, 602, 603, 604 which latter are connected in series with the load circuits 10, 20, 30, 40. Thus 301, 302, 303, 304 receive rectified current proportional to the alternating current which flows in 10, 20, 30, 40, respectively. The windings 301, 302, 303, 304 and 501, 502, 503, 504 are connected so that their magnetic effects are in opposition.

As explained more fully in U. S. Patent No. 2,027,312, the effect of this arrangement is to provide "stick relay" controlling action in respect of the current in the load circuit. Each of the reactors 12, 22, 32, 42 has two conditions of stability, one of which gives a high value of current in the corresponding load circuit and the other of which gives a much lower value such that the load circuit is substantially de-energized. These two conditions are determined by residual magnetic effects of the core of the reactor and can be pre-determined by applying suitable controlling magnetomotive forces to the core of the reactor as described in the cited patent.

One method of actuating this arrangement, described in U. S. Patent No. 2,027,312, is to provide a third winding, as, for example, the winding 4 in Fig. 1 of the cited patent and to energize this with reversible direct current excitation.

In the present invention I obtain this result by means of the two windings 14A, 14B, etc. as shown in Fig. 1 of the present application. These pairs of windings, each of which is energized from corresponding rectifiers 15A, 15B, etc. are connected to excite the cores of the reactors 12, 22, 32, 42, in opposite sense.

It has been explained above that by means of the reversing switch 55, one or other of the two groups of reactors 16A, 26A, 36A, 46A, or 16B, 26B, 36B, 46B, may be selected. As a result thereof the selective action of switch 55 controls the energization of the two groups of rectifiers 15A, 25A, 35A, 45A, and 15B, 25B, 35B, 45B. This in turn provides selective energization of the windings 14A, 14B, 24A, 24B, 34A, 34B, 44A, 44B. Accordingly the polarity of the excitation applied to any given reactor of the group comprising 12, 22, 32, 42, may be pre-determined by switch 55. Thus, operation of one of the switches 100, 200, 300, 400 selects the corresponding load circuit. If the switch 55 be closed on contacts 56A, 57A, the selected reactor of the group comprising 12, 22, 32, 42, will receive excitation tending to throw the corresponding load circuit "on". If the switch 55 be closed on contacts 56B, 57B, the "off" controlling effect will be manifested.

Suppose, as shown in the diagram, for example, that switch 200 be closed and that the switch 55 be closed on the "B" of "off" side. Under this condition current will be stopped by rectifiers 58A, 59A; 58B, 59B will pass saturating current. Thus the reactors 16A, 26A, 36A, 46A will be inactive, but 16B, 26B, 36B, 46B, will operate selectively to energize the rectifier 25B. There will be no energization of 25A. Thus winding 24B will be energized, but not 24A. This will cause the current in the load circuit 20 to be, in effect, switched off. Switches 200 and 55 may now be opened without further affecting the current in 20. The switch 55 and the selector switches 100, 200, 300, 400 may be left open or may be employed to control one or more of the remaining load circuits. If, later, 200 be again closed with 55 on contacts 56A, 57A, the winding 24A will be energized instead of 24B, and the current in 20 will be increased to the full amount.

If at any time the switches 55 and 100, 200, 300, 400 be manipulated so as to supply an "on" controlling effect to a load circuit that is already on, or to apply an "off" signal where the load is already off, no action of any kind results. The controlling action is positive and not sequential.

Furthermore, no controlling effect is applied to any other load circuit except the selected one when the latter is controlled.

All of the load circuits 10, 20, 30, 40 retain their condition of energization after the conductors 51, 52, 53 are momentarily energized to give any required controlling effect. The transmission channel represented by these conductors need not, therefore, be occupied continuously, but only as and when it is desired to change the condition of energization of the load circuits 10, 20, 30, 40.

I show in Fig. 2, certain non-essential details which I have found to be helpful in practicing my invention and which have been omitted from Fig. 1 in order to explain as clearly as possible the essential operating principles.

Fig. 2 shows one of the saturating reactors which carry the load circuit current as, for example, 12. It is to be understood that the features shown in Fig. 2 may be applied to 12, 22, 32, and 42. It will be noted on referring to the diagram that the windings 14A, 14B are in inductive relation with windings 301, 501, both of which carry rectified currents. These rectified currents may contain a double frequency component which latter may set up transformer currents in 14A, 14B. In certain cases the action of the control system can be improved by limiting these currents. This can readily be done by including small chokes in the connections from the rectifiers 15A, 15B to the windings 14A, 14B. In view of the fact that this transformer effect sets up like E. M. F.'s in these two windings, a convenient and economical arrangement is shown in Fig. 2 in which a single choke 60 has duplicate windings 61A, 61B. It will be noted that these windings are connected so that their M. M. F.'s are additive in respect of the choke action desired, whereas any small direct currents which may normally be present in these windings, set up opposing M. M. F.'s. The choke coil 60, therefore, need not have an air-gap and is accordingly small and inexpensive. An additional short-circuited winding in inductive relation with the saturating windings or a closed path provided in parallel with one of the saturating windings, would serve the same purpose. For example, I show in Fig. 2, an adjustable "trimmer" diverter resistor 62 in parallel with winding 501. If the reactors 12, 22, 32, 42 are not exactly uniform in characteristics it may be convenient to be able to make slight individual adjustments of the several currents in 501, 502, 503, 504.

I have found that the operation of my invention is improved if means be included whereby the response of reactors 12, 22, 32, 42 to the controlling voltages set up by the reactors 16A, 16B, 26A, 26B, 36A, 36B, 46A, 46B, have a definite threshold value. By this it is meant that only voltages derived from the windings 17A, 17B, etc., which exceed a pre-determined value, should be effective in changing the condition of the reactors 12, 22, 32, 42. One method of accomplishing this result is to include between the reactors 16A, 16B, 26A, 26B, 36A, 36B, 46A, 46B, and the reactors 12, 22, 32, 42, non-linear conducting devices of the type which are substantially non-conducting at low voltages and effectively conducting at higher voltages such as, for example, the material known in the trade as "Thyrite", or like devices. However, it will be understood by those skilled in the art that practically all known types of rectifiers exhibit non-linear conducting characteristics in greater or less degree. The rectifiers 15A, 15B, 25A, 25B, 35A, 35B, 45A, 45B may, therefore, with advantage be of a type consistent with this consideration.

The manual control arrangement shown in Fig. 1, comprising switches 55, 100, 200, 300 and 400, indicates clearly the nature of the controlling effect manifested. However, I prefer to employ apparatus such as is shown in Fig. 3, which furnishes precisely the same electrical result with a single manual operation.

In Fig. 3, I show the selective receiving system 1, load devices 10, 20, 30, 40, and transmitting conductors 51, 52, 53, all as shown in Fig. 1, the internal connections of 1 being omitted in Fig. 3.

At the control or transmitting end I show the tapped resistor 54, as in Fig. 1. Instead of a direct current source 9, I show an alternating current source 90, this being more usual in practical applications. It is immaterial whether or not the source 90 be synchronous with the source 2, or whether or not these sources be of the same frequency.

In place of the switches 100, 200, 300, 400, I show in Fig. 3 two sets of push buttons, 100A, 200A, 300A, 400A, and 100B, 200B, 300B, 400B. The former are of the type which, when depressed, close two separate circuits and the latter of the type which close three separate circuits.

In Fig. 3, the reversing switch 55 is of the electrically operated type, having a magnet coil 63. The contacts 56A, 57A are closed when 63 is de-energized. Operation of 63 causes the contacts 56A, 57A, to be opened and contacts 56B, 57B to be closed. The switch 55 is energized with rectified current from a rectifier 64, supplied from the source 90.

It will be seen, on referring to Fig. 3, that the first, or left hand contact on each of the push buttons connects the conductor 52 to one of the taps on the resistor 54. The second contact, on each push button, all being connected in parallel, energizes the rectifier 64 from the source 90. The third contact on the lower row of push buttons 100B, 200B, 300B, 400B, only, all of which are likewise connected in parallel, causes the coil 63 of the reversing switch 55 to be energized from the source 90.

It will, therefore, be apparent that, normally, no push buttons being depressed, the apparatus at the transmitting station is entirely disconnected from the source 90, and conductors 51, 52, 53 are de-energized. When, however, any one of these push buttons is depressed, the rectifier 64 is energized from the source 90. If one of the "on" buttons is pressed, 63 is not energized and the conductors 51 and 53 are energized with 51 negative and 53 positive. If, however, one of the "off" buttons is operated, not only is the rectifier 64 energized, but, through the third or right hand contact, coil 63 is energized, operating 55. This causes the conductors 51 and 53 to be energized with the opposite polarity, so that 51 is positive and 53 is negative. At the same time, whenever any one of the push buttons is depressed, conductor 52 is connected to one of the taps on the resistor 54.

Thus, with a single action, the selective system 1 is controlled so as to energize or de-energize one of the load circuits 10, 20, 30 or 40. Pressing one of the upper row of buttons causes the selected load circuit to be switched "on". Pressing one of the lower row of buttons causes the selected load circuit to be switched "off".

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In an electrical system, an alternating current supply circuit, a plurality of load circuits, a plurality of saturable core devices, each of said devices having a reactance winding connected to control the energization of one of said load circuits, a saturating winding and means for energizing said saturating winding with current variable in accordance with the magnetization of the core of said device, whereby under one magnetic condition of said core said load circuit is energized to a substantial extent and under another condition said load circuit is energized to a less extent, and a control winding for determining the magnetic condition of said core together with a selective system comprising a further plurality of saturable core devices each having a reactance winding and a saturating winding and means for selectively controlling the saturating winding of each of said last mentioned saturable core devices, permanently closed connecting means connecting the reactance winding of each of said second mentioned saturable core devices to one of said control windings for severally determining the mentioned saturable core devices for severally determining the said magnetic condition of the cores of said devices so as selectively to control the energization of said load circuits.

2. In combination, an alternating current supply circuit, a plurality of load circuits, a plurality of electric control circuits, each comprising a saturable core device having a direct current saturating winding and an alternating current winding connected to control the energization of one of said load circuits from said supply circuit, means for energizing said saturating winding with a direct current variable in accordance with the current in said alternating current winding, the ratio of the magnetomotive forces of said windings being such that the magnetomotive force of said direct current winding increases the build-up of current from zero in said alternating current winding when the residual magnetic condition of said core has one polarity and reduces the build-up of current from zero in said alternating current winding when said residual magnetic condition has the opposite polarity, and means for determining said polarity so as to control the energization of said load circuit in accordance therewith, together with a selective control system comprising a plurality of further saturable core devices having each an alternating current winding, means for connecting all of said alternating current windings in series to said supply circuit, means for energizing each of said polarity determining means in accordance with the voltage across one of said alternating current windings, means for providing a plurality of variable direct currents, and means for subjecting, differently, each of said last-mentioned saturable core devices to a saturating effect derived jointly from said direct currents, whereby a pre-determined relation between the magnitudes of said currents causes one of said saturable core devices to be substantially unsaturated so as to cause an increase in the energization of one of said polarity determining means due to said unsaturated condition.

3. In combination, an alternating current supply circuit, a plurality of load circuits, a plurality of electric control circuits, each comprising a saturable core device having a direct current saturating winding and an alternating current winding connected to control the energization of one of said load circuits from said supply circuit, means for energizing said saturating winding with a direct current variable in accordance with the current in said alternating current winding, the ratio of the magnetomotive forces of said windings being such that the magnetomotive force of said direct current winding increases the build-up of current from zero in said alternating current winding when the residual magnetic condition of said core has one polarity and reduces the build-up of current from zero in said alternating current winding when said residual magnetic condition has the opposite polarity, and means for determining said polarity so as to control the energization of said load circuit in accordance therewith, together with a first selective control system comprising a plurality of further saturable core devices having each an alternating current winding, means for connecting all of said alternating current windings in series to said supply circuit, means for energizing each of said polarity determining means with one polarity in accordance with the voltage across one of said alternating current windings, means for providing a plurality of variable direct currents, and means for subjecting, differently, each of said saturable core devices to a saturating effect derived jointly from said direct currents whereby a predetermined relation between the magnitudes of said currents causes one of said saturable core devices to be substantially unsaturated so as to cause an increase in the energization of one of said polarity determining means due to said unsaturated condition, and a second selective control system similar to said first selective control system, means for energizing each of said polarity determining means with the opposite polarity, in accordance with the voltage across one of the alternating current windings of one of the saturable core devices in said second selective control system, and means for causing a predetermined one of said first and said second selective control systems to be operative with respect of said electric control circuits.

4. In a selective control system, an alternating current supply circuit, a plurality of output circuits, a further like number of output circuits, a plurality of saturable core devices, having each an alternating current winding, means for connecting all of said alternating current windings in series to said supply circuit, means for energizing each of said first-mentioned output circuits in accordance with the voltage across one of said alternating current windings, a further plurality of saturable core devices having each an alternating current winding, connected in like manner to energize each of said second-mentioned output circuits, a direct current supply circuit, means for reversing the polarity of said direct current supply circuit, unilaterally conducting means energized from said direct current supply circuit for applying effective saturating excitation selectively to all of said first-mentioned saturable core devices except a predetermined one, selectively to control the energization of said output circuits in accordance with said selective saturating excitation, means unilaterally conducting in opposite sense, likewise energized from said direct current supply circuit, for applying selective saturating excitation to all of said second-mentioned saturable core devices except one, in like manner, whereby when said direct current supply circuit has one polarity, selective saturating excitation is applied to said first-mentioned saturable core devices, but not to said second-mentioned devices, and when said polarity is reversed selective saturating excitation is applied to said second-mentioned saturable core devices, but not to said first-mentioned devices, selectively to control the energization of said output circuits in accordance with said selective saturating excitation.

5. In a selective control system, a plurality of devices relatively responsive in accordance with the direction of flow of energy, a plurality of output devices capable of furnishing uni-directional energy, means connecting each of said output devices to one of said responsive devices, a further like number of uni-directional output devices, means connecting each of said second mentioned output devices to one of said directionally responsive devices in opposite sense, a direct current supply circuit, means for reversing the polarity of said direct current supply circuit, unilaterally conducting means connecting all of said first mentioned output devices to said direct current supply circuit, means unilaterally conducting in opposite sense connecting all of said second mentioned output devices to said direct current supply circuit, means for varying a characteristic of the energy of either polarity supplied from said direct current supply circuit to said output devices, means selectively responsive to said variable characteristic associated with said output devices, so that, when said direct current supply circuit has one polarity selective energization is applied to said first mentioned output devices but not to said second mentioned output devices, to actuate one of said first mentioned output devices, and when said polarity is reversed selective energization is applied to said second mentioned output devices but not to said first mentioned output devices to actuate one of said second mentioned output devices, whereby any one of said directionally responsive devices is selectively energized in a pre-determined sense.

ALAN S. FITZ GERALD.